United States Patent
Chaudhari et al.

(10) Patent No.: US 11,582,443 B1
(45) Date of Patent: Feb. 14, 2023

(54) ARCHITECTURE TO ADAPT CUMULATIVE DISTRIBUTION FUNCTIONS FOR MODE DECISION IN VIDEO ENCODING

(71) Applicant: Meta Platforms, Inc., Menlo Park, CA (US)

(72) Inventors: Gaurang Chaudhari, Sunnyvale, CA (US); Hariharan G. Lalgudi, San Diego, CA (US); Yunqing Chen, Los Altos, CA (US); Harikrishna Madadi Reddy, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/179,138

(22) Filed: Feb. 18, 2021

(51) Int. Cl.
*H04N 19/103* (2014.01)
*H04N 19/13* (2014.01)
*H04N 19/119* (2014.01)

(52) U.S. Cl.
CPC ......... *H04N 19/103* (2014.11); *H04N 19/119* (2014.11); *H04N 19/13* (2014.11)

(58) Field of Classification Search
CPC ..... H04N 19/103; H04N 19/119; H04N 19/13
See application file for complete search history.

(56) References Cited

U.S. PATENT DOCUMENTS

| | | | |
|---|---|---|---|
| 7,499,492 B1 * | 3/2009 | Ameres .................. | H04N 19/89 375/240.12 |
| 2020/0186809 A1 * | 6/2020 | Mukherjee ............... | G06T 9/002 |

OTHER PUBLICATIONS

Chiang et al., A Multi-Pass Coding Mode Search Framework for AV1 Encoder Optimization, 2019 Data Compression Conference (DCC), 2019 IEEE.
Guo et al., A Bayesian Approach to Block Structure Inference in AV1-Based Multi-Rate Video Encoding, Jul. 14, 2018.
Guo et al., Fast Block Structure Determination in AV1-Based Multiple Resolutions Video Encoding, Jul. 14, 2018.
Jeong et al., A Fast Intra Mode Decision Based on Accuracy of Rate Distortion Model for AV1 Intra Encoding, Jun. 26, 2019.
Kamaci et al., Frame Bit Allocation for the H.264/AVC Video Coder Via Cauchy-Density-Based Rate and Distortion Models, IEEE Transactions on Circuits and Systems for Video Technology, vol. 15, No. 8, Aug. 2005, pp. 994-1006.

* cited by examiner

*Primary Examiner* — Tat C Chio
(74) *Attorney, Agent, or Firm* — Van Pelt, Yi & James LLP (57) ABSTRACT

A mode decision component is configured to determine the costs of different modes for a selected partition of a frame of a video using an estimated compression coding data, which is calculated prior to a corresponding actual compression coding data being calculated based on another partition immediately prior to the selected partition in a partition processing order. The estimated compression coding data is determined based on a previously calculated compression coding data calculated based on a completed partition prior to the selected partition in the partition processing order. The mode decision component is configured to use the determined costs to select one of the modes. An encoder component is configured to use the selected mode to encode the selected partition by using the corresponding actual compression coding data calculated based on the another partition immediately prior to the selected partition in the partition processing order.

20 Claims, 5 Drawing Sheets

ARCHITECTURE TO ADAPT CUMULATIVE DISTRIBUTION FUNCTIONS FOR MODE DECISION IN VIDEO ENCODING

BACKGROUND OF THE INVENTION

A video coding format is a content representation format for storage or transmission of digital video content (such as in a data file or bitstream). It typically uses a standardized video compression algorithm. Examples of video coding formats include H.262 (MPEG-2 Part 2), MPEG-4 Part 2, H.264 (MPEG-4 Part 10), HEVC (H.265), Theora, RealVideo RV40, VP9, and AV1. A video codec is a device or software that provides encoding and decoding for digital video. Most codecs are typically implementations of video coding formats.

Recently, there has been an explosive growth of video usage on the Internet. Some websites (e.g., social media websites or video sharing websites) may have billions of users and each user may upload or download one or more videos each day. When a user uploads a video from a user device onto a website, the website may store the video in one or more different video coding formats, each being compatible with or more efficient for a certain set of applications, hardware, or platforms. Therefore, higher video compression rates are desirable. For example, AV1 offers up to 50% more compression compared to its predecessor. However, with higher compression ratio comes higher computational complexity; therefore, improved hardware architecture and techniques in video coding would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
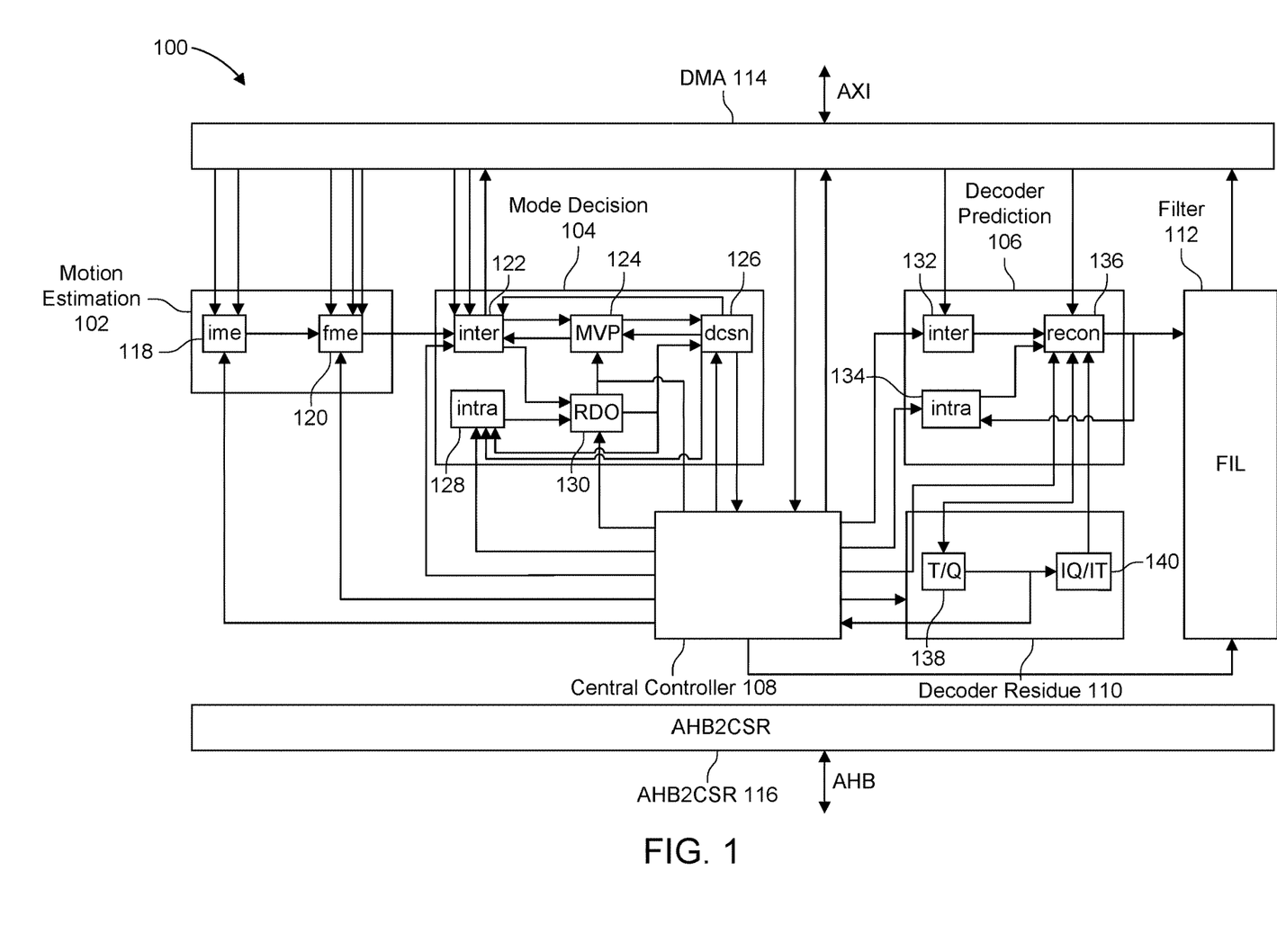
FIG. 1 illustrates a block diagram of an embodiment of a video encoder 100.

FIG. 1 illustrates a block diagram of an embodiment of a video encoder 100. For example, video encoder 100 supports the video coding format AV1 (Alliance for Open Media Video 1). However, video encoder 100 may also support other video coding formats as well. AV1 is an open and royalty-free video coding format. AV1 was developed as a successor to VP9.

Video encoder 100 includes many modules. Some of the main modules of video encoder 100 are shown in FIG. 1. As shown in FIG. 1, video encoder 100 includes a direct memory access (DMA) controller 114 for transferring video data. Video encoder 100 also includes an AMBA (Advanced Microcontroller Bus Architecture) to CSR (control and status register) module 116. Other main modules include a motion estimation module 102, a mode decision module 104, a decoder prediction module 106, a central controller 108, a decoder residue module 110, and a filter 112.

Video encoder 100 includes a central controller module 108 that controls the different modules of video encoder 100, including motion estimation module 102, mode decision module 104, decoder prediction module 106, decoder residue module 110, filter 112, and DMA controller 114.

Video encoder 100 includes a motion estimation module 102. Motion estimation module 102 includes an integer motion estimation (IME) module 118 and a fractional motion estimation (FME) module 120. Motion estimation module 102 determines motion vectors that describe the transformation from one image to another, for example, from one frame to an adjacent frame. A motion vector is a two-dimensional vector used for inter-frame prediction: it refers the current frame to the reference frame, and its coordinate values provide the coordinate offsets from a location in the current frame to a location in the reference frame. Motion estimation module 102 estimates the best motion vector, which may be used for inter prediction in mode decision module 104. An inter coded frame is divided into blocks known as macroblocks. Instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as a motion vector, which points to the position of the matching block at the reference frame. The process of motion vector determination is called motion estimation.

Video encoder 100 includes a mode decision module 104. The main components of mode decision module 104 include an inter prediction module 122, an intra prediction module 128, a motion vector prediction module 124, a rate-distortion optimization (RDO) module 130, and a decision module 126. Mode decision module 104 detects one prediction mode among a number of candidate inter prediction modes and intra prediction modes that gives the best results for encoding a block of video.

Intra prediction is the process of deriving the prediction value for the current sample using previously decoded sample values in the same decoded frame. Intra prediction exploits spatial redundancy, i.e., correlation among pixels within one frame, by calculating prediction values through extrapolation from already coded pixels for effective delta coding. Inter prediction is the process of deriving the prediction value for the current frame using previously decoded reference frames. Inter prediction exploits temporal redundancy.

Rate-distortion optimization (RDO) is the optimization of the amount of distortion (loss of video quality) against the amount of data required to encode the video, i.e., the rate. RDO module 130 provides a video quality metric that measures both the deviation from the source material and the bit cost for each possible decision outcome. Both inter prediction and intra prediction have different candidate prediction modes, and inter prediction and intra prediction that are performed under different prediction modes may result in final pixels requiring different rates and having different amounts of distortion and other costs.

For example, different prediction modes may use different block sizes for prediction. In some parts of the image there may be a large region that can all be predicted at the same time (e.g., a still background image), while in other parts there may be some fine details that are changing (e.g., in a talking head) and a smaller block size would be appropriate. Therefore, some video coding formats provide the ability to vary the block size to handle a range of prediction sizes. The decoder decodes each image in units of superblocks (e.g., 128x128 or 64x64 pixel superblocks). Each superblock has a partition which specifies how it is to be encoded. Superblocks may be divided in to smaller blocks according to different partitioning patterns. This allows superblocks to be divided into partitions as small as 4x4 pixels.

Besides using different block sizes for prediction, different prediction modes may use different settings in inter prediction and intra prediction, respectively. For example, there are different inter prediction modes corresponding to using different reference frames, which have different motion vectors. For intra prediction, the intra prediction modes depend on the neighboring pixels, and AV1 uses eight main directional modes, and each allows a supplementary signal to tune the prediction angle in units of 3°.

RDO module 130 receives the output of inter prediction module 122 corresponding to each of the inter prediction modes and determines their corresponding amounts of distortion and rates, which are sent to decision module 126. Similarly, RDO module 130 receives the output of intra prediction module 128 corresponding to each of the intra prediction modes and determines their corresponding amounts of distortion and rates, which are also sent to decision module 126.

In some embodiments, for each prediction mode, inter prediction module 122 or intra prediction module 128 predicts the pixels, and the residual data (i.e., the differences between the original pixels and the predicted pixels) may be sent to RDO module 130, such that RDO module 130 may determine the corresponding amount of distortion and rate. For example, RDO module 130 may estimate the amounts of distortion and rates corresponding to each prediction mode by estimating the final results after additional processing steps (e.g., applying transforms and quantization) are performed on the outputs of inter prediction module 122 and intra prediction module 128.

Decision module 126 evaluates the cost corresponding to each inter prediction mode and intra prediction mode. The cost is based at least in part on the amount of distortion and the rate associated with the particular prediction mode. In some embodiments, the cost (also referred to as rate distortion cost, or RD Cost) may be a linear combination of the amount of distortion and the rate associated with the particular prediction mode; for example, RD Cost=distortion+ $\lambda$ *rate, where $\lambda$ is a Lagrangian multiplier. The rate includes different components, including the coefficient rate, mode rate, partition rate, and token cost/probability. Other additional costs may include the cost of sending a motion vector in the bit stream. Decision module 126 selects the best inter prediction mode that has the lowest overall cost among all the inter prediction modes. In addition, decision module 126 selects the best intra prediction mode that has the lowest overall cost among all the intra prediction modes. Decision module 126 then selects the best prediction mode (intra or inter) that has the lowest overall cost among all the prediction modes. The selected prediction mode is the best mode detected by mode decision module 104.

After the best prediction mode is selected by mode decision module 104, the selected best prediction mode is sent to central controller 108. Central controller 108 controls decoder prediction module 106, decoder residue module 110, and filter 112 to perform a number of steps using the mode selected by mode decision module 104. This generates the inputs to an entropy coder that generates the final bitstream. Decoder prediction module 106 includes an inter prediction module 132, an intra prediction module 134, and a reconstruction module 136. If the selected mode is an inter prediction mode, then the inter prediction module 132 is used to do the inter prediction, whereas if the selected mode is an intra prediction mode, then the intra prediction module 134 is used to do the intra prediction. Decoder residue module 110 includes a transform and quantization module (T/Q) 138 and an inverse quantization and inverse transform module (IQ/IT) 140.

Figure 2:
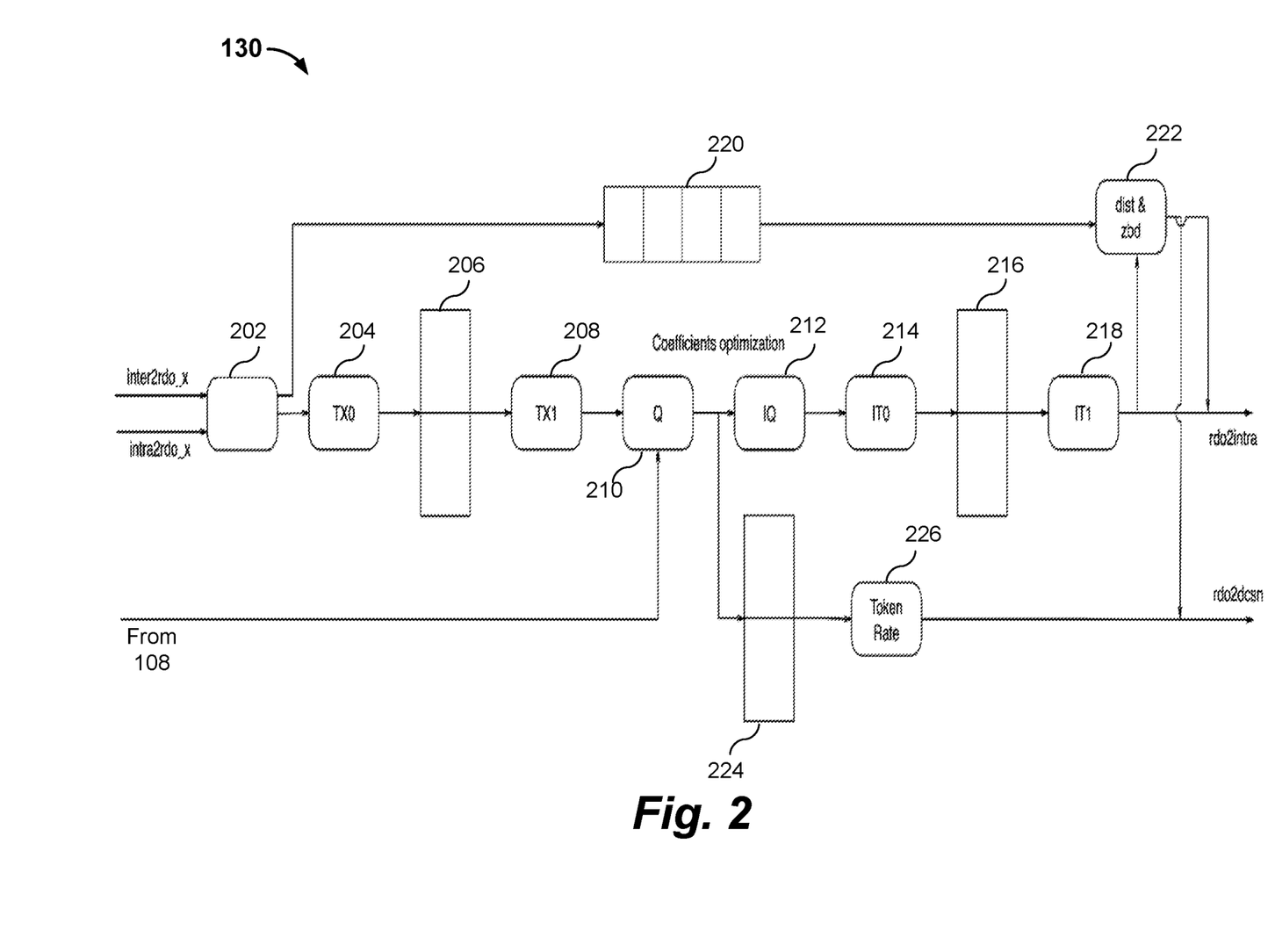
FIG. 2 illustrates an exemplary block diagram of RDO module 130.

FIG. 2 illustrates an exemplary block diagram of RDO module 130. RDO module 130 includes an arbiter and buffer module 202 for receiving inputs from inter prediction module 122 and intra prediction module 128, respectively. The received inputs include the residue data (i.e., the differences between the source/original pixels and the predicted pixels) corresponding to different prediction modes. The residue data is referred to as the original residue, given by original residue=source pixels−predicted pixels. These residues are then transformed using a 2-dimensional transform performed by two stages of transform modules, TX0 module 204 and TX1 module 208, with a transpose operation module 206 in between. After the transform, the transformed values form a transform block, which is a square transform coefficient matrix with a DC coefficient and a plurality of AC coefficients. The transform coefficients are then compressed further by quantizing the coefficients via a quantization module 210.

Distortion may be based on the original residue=source pixels−predicted pixels and the reconstruction residue. For example, one metric is the sum of the squared estimate of errors (SSE), the sum of the squares of the original residue.

In order to estimate the amounts of distortion experienced by the decoder, a number of processing steps are performed on the quantized coefficients. Inverse quantization (i.e., dequantization) is performed by a dequantization module 212 and an inverse transform is performed by two stages of inverse transform modules, IT0 module 214 and IT1 module 218, with a transpose operation module 216 in between. The results after the inverse transform are then compared with the original block of residual pixels at the output of a buffer 220 by a distortion estimation module 222, such that the amounts of distortion corresponding to different prediction modes are determined and sent to decision module 126.

The rates associated with sending the data corresponding to a block in a bitstream are also estimated by RDO module 130. One component of the rate is the coefficient rate, which is the rate associated with sending the quantized coefficients in the bitstream. The quantized coefficients at the output of quantization module 210 are sent to a ping-pong buffer 224 and a token rate module 226, where the rate associated with a particular block may be estimated. The rates are estimated by token rate module 226 without performing the actual encoding, because the actual encoding of the bitstream is computationally intensive and requires additional information, e.g., neighbor dependency or other neighbor information, which is not available. Coefficient rate estimation by token rate module 226 is performed for every transform unit (TU) that goes through the RDO process in mode decision module 104. The rate estimation is based on the quantized coefficients.

Because the purpose of the transform is to concentrate the energy in only a few significant coefficients, after quantization, the non-significant transform coefficients are reduced to zeros or near zeros, and therefore the quantized transform coefficient matrix typically has only a non-zero DC coefficient and a small number of non-zero AC coefficients. The end-of-block (EOB) is the location in the matrix where all of the subsequent coefficients are zeros.

The first coefficient is the DC coefficient and its rate is computed based on a function of the coefficient value, the neighbor context, and the token cost. The subsequent AC coefficients are evaluated based on a scan order defined by a scan table that specifies a path through the quantized transform coefficient matrix that is most likely to find all non-zero coefficients while encountering as few zero coefficients as possible. Different modes and different transform types may use a different scan order. The rate of an AC coefficient is computed based on a function of the coefficient value, the neighbor context, and the token cost.

Figure 3:
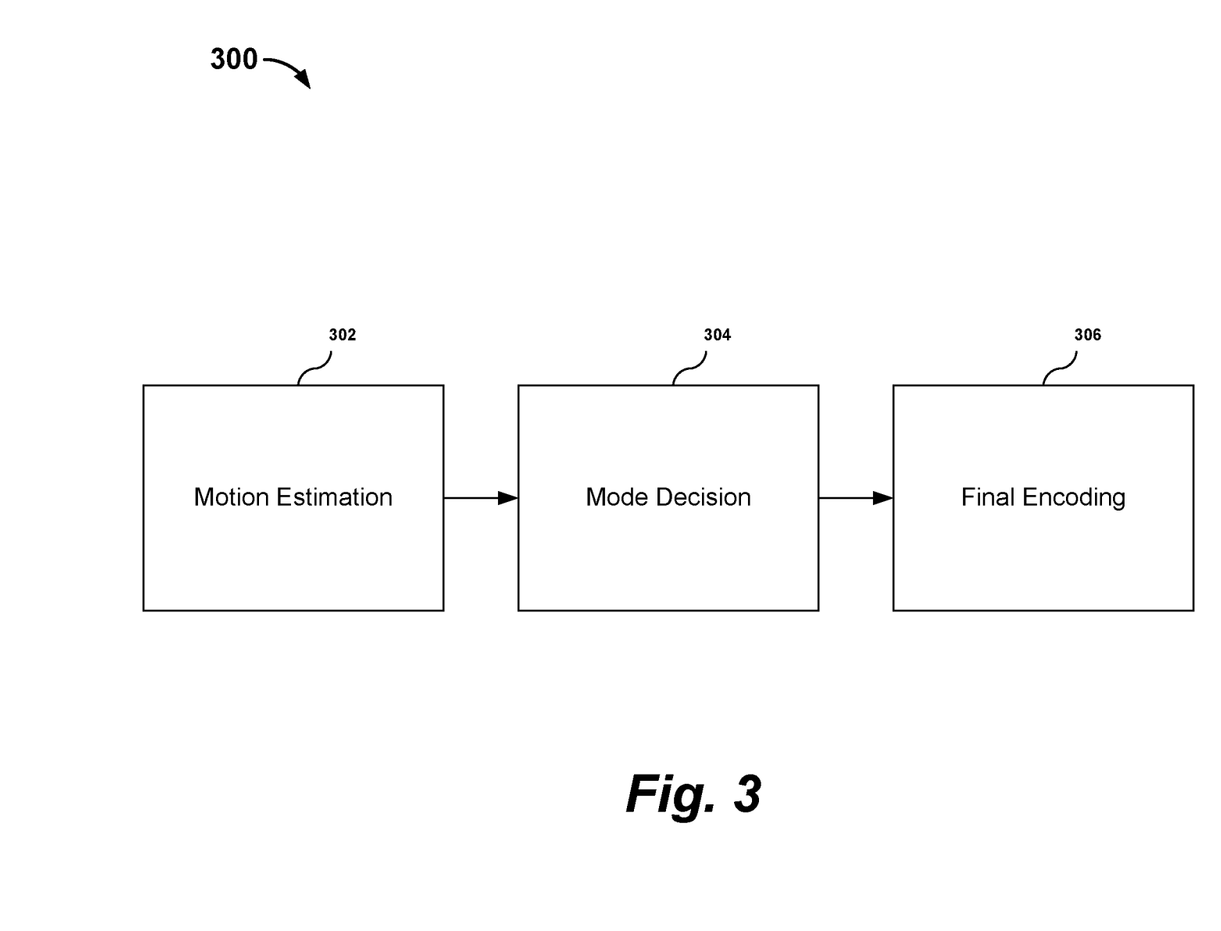
FIG. 3 illustrates an embodiment of an encoding pipeline 300 for processing a single superblock of a frame of video.

FIG. 3 illustrates an embodiment of an encoding pipeline 300 for processing a single superblock of a frame of video. In FIG. 3, the three main functional blocks of encoding pipeline 300 are shown. The three main blocks include a motion estimation block 302, a mode decision block 304, and a final encoding block 306. Motion estimation block 302 performs the process of motion vector determination. Mode decision block 304 employs rate-distortion optimization to decide the best mode and partition split that give the best results for encoding the superblock of the frame of video. Final encoding block 306 computes the residue and the transform coefficients for the selected mode and superblock. Final encoding block 306 further performs entropy coding.

In entropy coding, in contrast to VP9, which uses a tree-based Boolean non-adaptive binary arithmetic code to encode all syntax elements, AV1 uses a symbol-to-symbol adaptive multi-symbol arithmetic code. Each syntax element in AV1 is a member of a specific alphabet of N elements, and a context consists of a set of N probabilities together with a count to facilitate fast early adaptation. The probabilities are stored as 15 bit cumulative distribution functions (CDFs). Each of the CDFs represents the probability times 32,768 that a symbol has a value less than or equal to a given level. AV1 arithmetic coding is based on the 15-bit CDF tables and the CDF tables are tracked and updated symbol-to-symbol. The CDF tables update is performed after the entropy coding is done.

Mode Decision block 304 employs rate-distortion optimization to find the best mode. The rate is calculated based on the coefficient cost, partition cost, mode cost, motion vector cost, etc. Each of these costs is computed based on the updated CDFs for that particular symbol.

Typically, for high throughput architectures or hardware that meets the power-performance throughput in high clock speeds (e.g., 1 GHz), each of the blocks in FIG. 3 is pipelined to support a throughput of one superblock unit. The number of cycles needed for one superblock may vary from architecture to architecture depending on the power-performance specification for the hardware. Typically, mode decision block 304 needs to process far more pixels in a cycle than the final encoding block 306 because mode decision block 304 needs to process many candidate modes in order to decide the best mode and partition split. In addition, the processing performed by mode decision block 304 is much more computationally complex than that performed by final encoding block 306.

The arithmetic coding in AV1 is based on the CDF tables that are tracked and updated symbol-to-symbol. In rate-distortion optimization, the cost computation of superblock N requires the CDF tables that were updated based on the previous superblock N-1. Therefore, mode decision block 304 cannot process superblock N using the required updated CDF tables until the final encoding and entropy coding block 306 has finished processing superblock N-1 and the CDF tables have been updated. In order to pipeline mode decision block 304 and the final encoding and entropy coding block 306, many intermediate buffers are required for storing the CDF tables for all modes evaluated by mode decision block 304. However, this approach is costly and impractical given the large number of modes that are needed to be evaluated in AV1. Another alternative is to allow mode decision block 304 to be idle until the final encoding and entropy coding block 306 has finished processing the previous superblock and the updated CDF tables become available. However, this approach is inefficient and sacrifices hardware utilization. In addition, it is difficult to have a codec agnostic architecture that works for codecs other than AV1, such as VP9. VP9 does not have the same problem because it uses a tree-based boolean non-adaptive binary arithmetic encoder to encode all syntax elements, and therefore the CDF tables are fixed for the entire frame. Therefore, an improved technique that uses a singular piece of hardware to support multiple codecs (e.g., VP9 and AV1) would be desirable.

In the present application, a hardware video processor is disclosed. A mode decision component includes one or more units configured to determine the costs of a plurality of different modes for a selected partition of a frame of a video using an estimated compression coding data. The estimated compression coding data is calculated prior to a corresponding actual compression coding data being calculated based on another partition immediately prior to the selected partition in a partition processing order. The estimated compression coding data is determined based on a previously calculated compression coding data calculated based on a completed partition prior to the selected partition in the partition processing order. The estimated compression coding data is further determined based on a correction factor. The mode decision component is further configured to use the determined costs to evaluate the plurality of different modes and select one of the modes. The hardware video processor further includes an encoder component including one or more units configured to use the selected mode to encode the selected partition of the frame of the video by using the corresponding actual compression coding data calculated based on the another partition immediately prior to the selected partition in the partition processing order.

Figure 4:
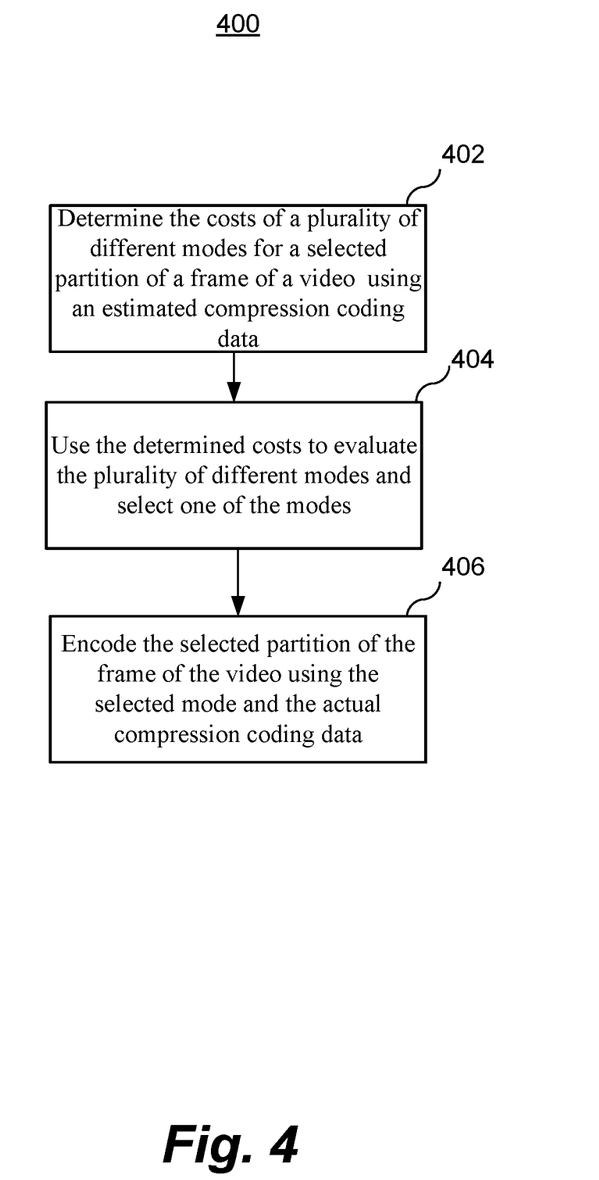
FIG. 4 illustrates an exemplary process 400 for determining the costs of a plurality of different modes for encoding a partition of a frame of a video, selecting a mode based on the costs, and encoding the partition of the frame of the video using the selected mode.

FIG. 4 illustrates an exemplary process 400 for determining the costs of a plurality of different modes for encoding a partition of a frame of a video, selecting a mode based on the costs, and encoding the partition of the frame of the video using the selected mode. In some embodiments, process 400 may be performed by mode decision block 304 and final encoding block 306.

At step 402, the costs of a plurality of different modes for a selected partition of a frame of a video are determined using an estimated compression coding data. For example, the selected partition of the frame of the video is the $N^{th}$ superblock (also referred to as superblock N) of the video frame.

Referring back to FIG. 1, video encoder 100 includes a mode decision module 104. The main components of mode decision module 104 include an inter prediction module 122, an intra prediction module 128, a motion vector prediction module 124, a rate-distortion optimization (RDO) module 130, and a decision module 126. Mode decision module 104 detects one mode among a number of candidate modes that gives the best results for encoding a block of video.

RDO module 130 receives the output of inter prediction module 122 corresponding to each of the inter prediction modes and determines their corresponding amounts of distortion and rates, which are sent to decision module 126. Similarly, RDO module 130 receives the output of intra prediction module 128 corresponding to each of the intra prediction modes and determines their corresponding amounts of distortion and rates, which are also sent to decision module 126.

Decision module 126 evaluates the cost corresponding to each inter prediction mode and intra prediction mode. In some embodiments, the cost (also referred to as rate distortion cost, or RD Cost) may be a linear combination of the amount of distortion and the rate associated with the particular prediction mode; for example, RD Cost=distortion+ $\lambda$ *rate, where $\lambda$ is a Lagrangian multiplier. The rate includes different components, including the coefficient rate, mode rate, partition rate, and token cost/probability. Other additional costs may include the cost of sending a motion vector in the bit stream. Decision module 126 selects the best inter prediction mode that has the lowest overall cost among all the inter prediction modes. In addition, decision module 126 selects the best intra prediction mode that has the lowest overall cost among all the intra prediction modes. Decision module 126 then selects the best prediction mode (intra or inter) that has the lowest overall cost among all the prediction modes. The selected prediction mode is the best mode detected by mode decision module 104.

Cost computation during mode decision requires compression coding data. Compression coding data includes statistical data for arithmetic encoding. For example, compression coding data may include the data stored in CDF tables for AV1 arithmetic coding. The cost computation of superblock N requires the CDF tables that were determined based on superblock N-1 (i.e., the superblock prior to superblock N) and were updated after superblock N-1 had undergone entropy coding. However, the required CDF tables are not yet available for the reasons discussed above. Instead, step 402 of process 400 utilizes estimated compression coding data for cost computation.

Figure 5:
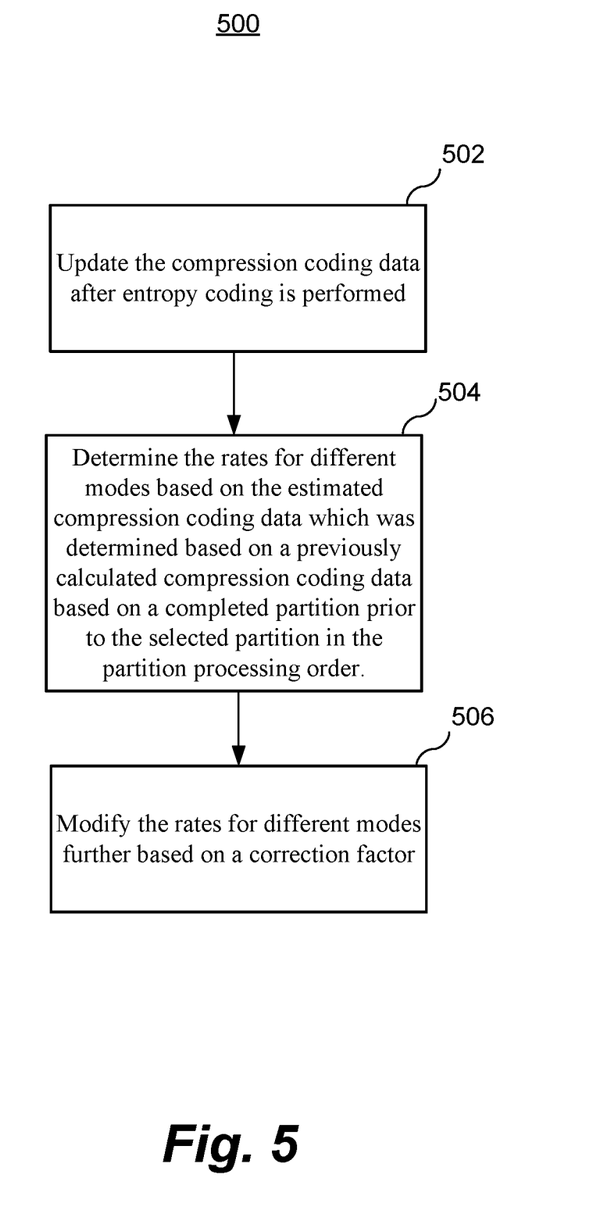
FIG. 5 illustrates an exemplary process 500 for determining a rate (as part of the cost computation) corresponding to a particular mode by utilizing an estimated compression coding data.

FIG. 5 illustrates an exemplary process 500 for determining a rate (as part of the cost computation) corresponding to a particular mode by utilizing estimated compression coding data. Process 500 may be performed in step 402 of process 400. It should be recognized that some of the steps in process 500 may be performed in parallel or in a different order.

At step 502, compression coding data is updated after entropy coding is performed. For example, in AV1, a symbol-to-symbol adaptive multi-symbol arithmetic code is used. Each syntax element in AV1 is a member of a specific alphabet of N elements, and a context consists of a set of N probabilities together with a count to facilitate fast early adaptation. The probabilities are stored as 15 bit cumulative distribution functions (CDFs). Each of the CDFs represents the probability times 32,768 that a symbol has a value less than or equal to a given level. AV1 arithmetic coding is based on the 15-bit CDF tables and the CDF tables are tracked and updated symbol-to-symbol. The CDF tables update is performed after the entropy coding is done. At step 502, the CDF tables may be updated based on superblock N-1 and stored for later usage.

At step 504, the rates for different modes are determined based on the estimated compression coding data which was determined in turn based on previously calculated compression coding data; wherein the previously calculated compression coding data is determined based on a completed partition prior to the selected partition in the partition processing order.

Let rate_N be the rate determined for the current superblock (superblock N), which is typically determined based on CDF tables that were updated up until superblock N-1. Instead of using these CDF tables that were updated based on the processing up until the previous superblock (i.e., superblock N-1), the CDF tables used to determine the rate, referred to as rate_N', were updated based on the processing up until a superblock that is P superblocks prior to the current superblock (i.e., superblock N-P). The CDF tables used are previously determined based on a completed partition (i.e., superblock N-P) that is prior to the current partition (i.e., superblock N) in a partition processing order. For example, the partition processing order is the order followed by processing sequentially the superblocks of a frame of video from top to bottom and from left to right. The pipeline gap P is a predetermined integer value that may be selected based on the hardware architecture. In some embodiments, P may be an integer between two to four. The pipeline gap P may be programmable and may be determined based on quality-performance tradeoff.

The estimated CDF tables used for determining rate_N' are calculated prior to a corresponding set of actual CDF tables being calculated based in turn on another partition immediately prior to the selected partition in a partition processing order. For example, CDF tables based on superblock N-P (i.e., CDF tables that were updated based on the processing up until a superblock that is P superblocks prior to the current superblock) are calculated prior to the calculating of the CDF tables based on superblock N-1 (i.e., the CDF tables that were updated based on the superblock that is immediately prior to the current superblock in the partition processing order).

At step 506, the rates for different modes are further determined based on a scaling factor. Because the CDF tables used may be inaccurate, rate_N' is a close estimate of rate_N, but there may be an error associated with rate_N'. The quality loss from using rate_N' versus rate N is generally within an acceptable range; however, to mitigate the quality loss, rate_N' may be further corrected based on a scaling factor. For example, the corrected rate estimation may be rate_N"=rate N'* correction factor. The correction factor may be a scaling factor that is learned from the processing of the previous partitions prior to the current partition. In some embodiments, the previous partitions may be the partitions that are one row above that of the current partition. In some embodiments, the previous partitions may be the superblocks that are one row above that of the current superblock, superblock N. For example, the previous partitions may be the four superblocks that are one row above. For example, let a superblock that is one row above that of the current superblock be superblock N-X. Because superblock N-X is one row above, the errors associated with calculating its corresponding to different modes may be determined. Therefore, the correction factor may be a ratio rate_N-X/rate_N-X', wherein rate_N-X is a rate determined based on a set of actual compression coding data and wherein rate_ N-X' is a rate determined based on a set of estimated compression coding data. In particular, rate_N-X is the rate determined for superblock N-X, which is determined based on CDF tables that were updated up until superblock N-X-1. And rate_N-X' is an estimated rate determined for superblock N-X, which is determined based on CDF tables that were updated up until superblock N-X-P, i.e., the superblock that is P superblocks prior to superblock N-X. In some embodiments, this correction factor for all of the superblocks that are one row above (e.g., the four superblocks that are one row above) may be averaged to get an average correction factor. In some embodiments, the correction factor is tuned and adapted as more and more superblocks and frames are processed. In some embodiments, machine learning models may be employed to determine the correction factor, Referring back to process 400 in FIG. 4, at step 404, the determined costs are used to evaluate the plurality of different modes and select one of the modes.

At step 406, the selected mode is used to encode the selected partition of the frame of the video by using the corresponding actual compression coding data calculated based on another partition immediately prior to the selected partition in the partition processing order. For example, CDF tables that are updated based on superblock N-1 (i.e., the CDF tables that were updated based on the superblock that is immediately prior to the current superblock in the partition processing order) may be used for encoding superblock N.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A hardware video processor, comprising:
a mode decision component including one or more units configured to:
determine costs of a plurality of different modes for a selected partition of a frame of a video using an estimated compression coding data prior to a corresponding actual compression coding data being calculated based on another partition immediately prior to the selected partition in a partition processing order, wherein the estimated compression coding data is determined based on a previously calculated compression coding data calculated based on a completed partition prior to the selected partition in the partition processing order, and wherein the determining of the cost of one of the plurality of different modes for the selected partition of the frame of the video using the estimated compression coding data comprises:
determining a rate of the one of the plurality of different modes for the selected partition of the frame of the video based on the previously calculated compression coding data calculated based on the completed partition prior to the selected partition in the partition processing order; and
use the determined costs to evaluate the plurality of different modes and select one of the modes; and
an encoder component including one or more units configured to:
use the selected mode to encode the selected partition of the frame of the video, including by using the corresponding actual compression coding data calculated based on the another partition immediately prior to the selected partition in the partition processing order.

2. The processor of claim 1, wherein the corresponding actual compression coding data being calculated based on the another partition immediately prior to the selected partition in the partition processing order is updated after the another partition had undergone entropy coding.

3. The processor of claim 1, wherein compression coding data comprises statistical data for arithmetic encoding.

4. The processor of claim 1, wherein compression coding data comprises data stored in cumulative distribution function (CDF) tables for arithmetic coding.

5. The processor of claim 1, wherein the completed partition is a predetermined number of partitions prior to the selected partition in the partition processing order.

6. The processor of claim 1, wherein the partition processing order comprises an order in which partitions are processed sequentially from top to bottom and from left to right.

7. The processor of claim 1, wherein the rate is modified based on a correction factor, wherein the correction factor is learned from processing of one or more partitions prior to the selected partition.

8. The processor of claim 7, wherein the one or more partitions prior to the selected partition comprises a partition that is one row above the selected partition.

9. The processor of claim 7, wherein the correction factor is a ratio of a rate determined based on an actual compression coding data to a rate determined based on an estimated compression coding data.

10. The processor of claim 7, wherein the correction factor is determined based on a machine learning model.

11. A method, comprising:
determining costs of a plurality of different modes for a selected partition of a frame of a video using an estimated compression coding data prior to a corresponding actual compression coding data being calculated based on another partition immediately prior to the selected partition in a partition processing order, wherein the estimated compression coding data is determined based on a previously calculated compression coding data calculated based on a completed partition prior to the selected partition in the partition processing order, and wherein the determining of the cost of one of the plurality of different modes for the selected partition of the frame of the video using the estimated compression coding data comprises:
  determining a rate of the one of the plurality of different modes for the selected partition of the frame of the video based on the previously calculated compression coding data calculated based on the completed partition prior to the selected partition in the partition processing order;
  using the determined costs to evaluate the plurality of different modes and select one of the modes; and
  using the selected mode to encode the selected partition of the frame of the video, including by using the corresponding actual compression coding data calculated based on the another partition immediately prior to the selected partition in the partition processing order.

12. The method of claim 11, wherein the corresponding actual compression coding data being calculated based on the another partition immediately prior to the selected partition in the partition processing order is updated after the another partition had undergone entropy coding.

13. The method of claim 11, wherein compression coding data comprises statistical data for arithmetic encoding.

14. The method of claim 11, wherein compression coding data comprises data stored in cumulative distribution function (CDF) tables for arithmetic coding.

15. The method of claim 11, wherein the completed partition is a predetermined number of partitions prior to the selected partition in the partition processing order.

16. The method of claim 11, wherein the partition processing order comprises an order in which partitions are processed sequentially from top to bottom and from left to right.

17. The method of claim 11, wherein the rate is modified based on a correction factor, wherein the correction factor is learned from processing of one or more partitions prior to the selected partition.

18. A system, comprising:
  a processor configured to:
    determine costs of a plurality of different modes for a selected partition of a frame of a video using an estimated compression coding data prior to a corresponding actual compression coding data being calculated based on another partition immediately prior to the selected partition in a partition processing order, wherein the estimated compression coding data is determined based on a previously calculated compression coding data calculated based on a completed partition prior to the selected partition in the partition processing order, and wherein the determining of the cost of one of the plurality of different modes for the selected partition of the frame of the video using the estimated compression coding data comprises:
      determining a rate of the one of the plurality of different modes for the selected partition of the frame of the video based on the previously calculated compression coding data calculated based on the completed partition prior to the selected partition in the partition processing order;
    use the determined costs to evaluate the plurality of different modes and select one of the modes; and
    use the selected mode to encode the selected partition of the frame of the video, including by using the corresponding actual compression coding data calculated based on the another partition immediately prior to the selected partition in the partition processing order; and
  a memory coupled to the processor and configured to provide the processor with instructions.

19. The system of claim 18, wherein the corresponding actual compression coding data being calculated based on the another partition immediately prior to the selected partition in the partition processing order is updated after the another partition had undergone entropy coding.

20. The system of claim 18, wherein compression coding data comprises statistical data for arithmetic encoding.

* * * * *